Dec. 27, 1960  H. H. NUSSBAUM  2,966,251
POWER DRIVEN CONVEYORS
Filed April 9, 1958  5 Sheets-Sheet 1
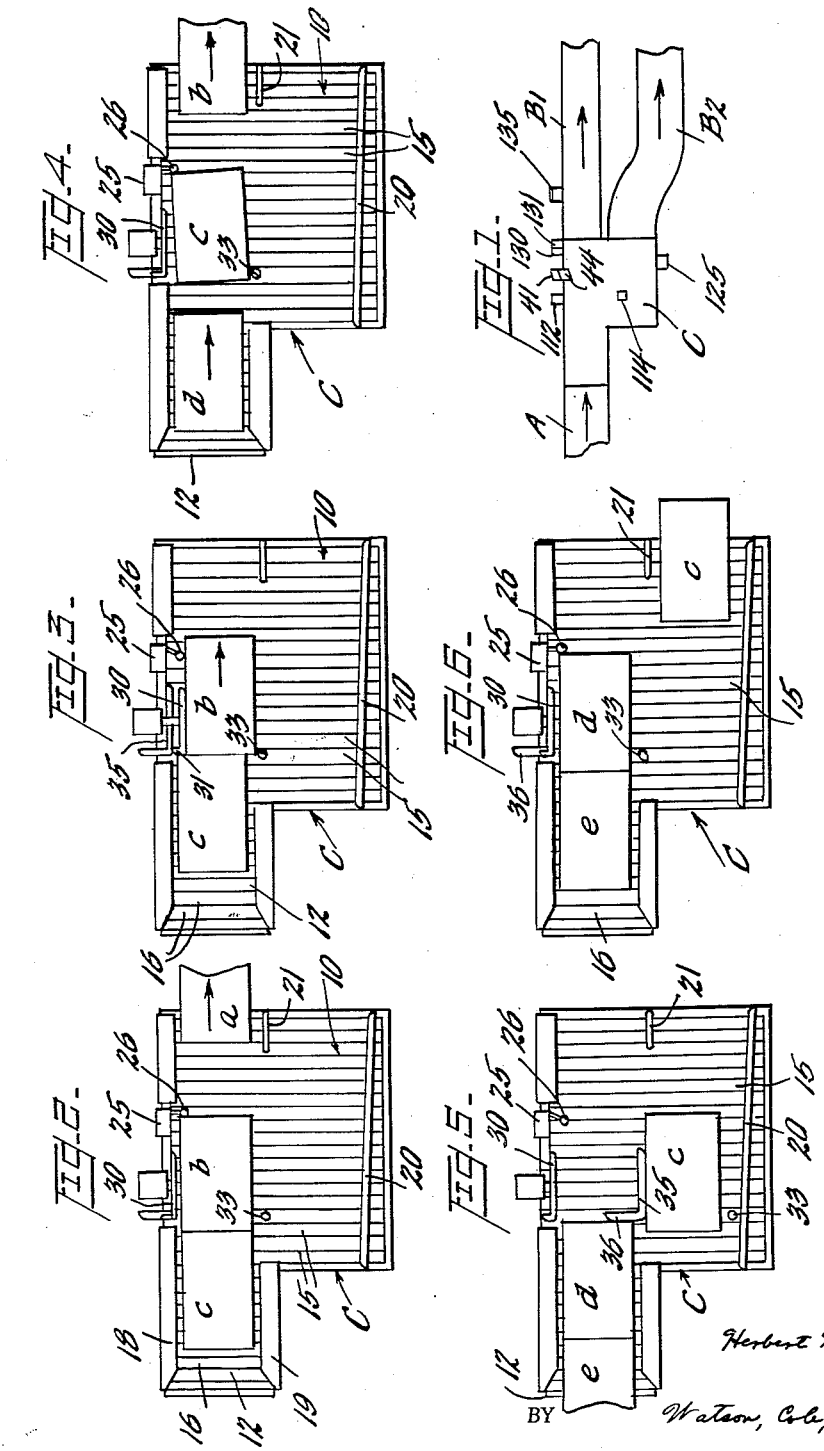
INVENTOR
Herbert H. Nussbaum
BY Watson, Cole, Grindle & Watson
ATTORNEYS

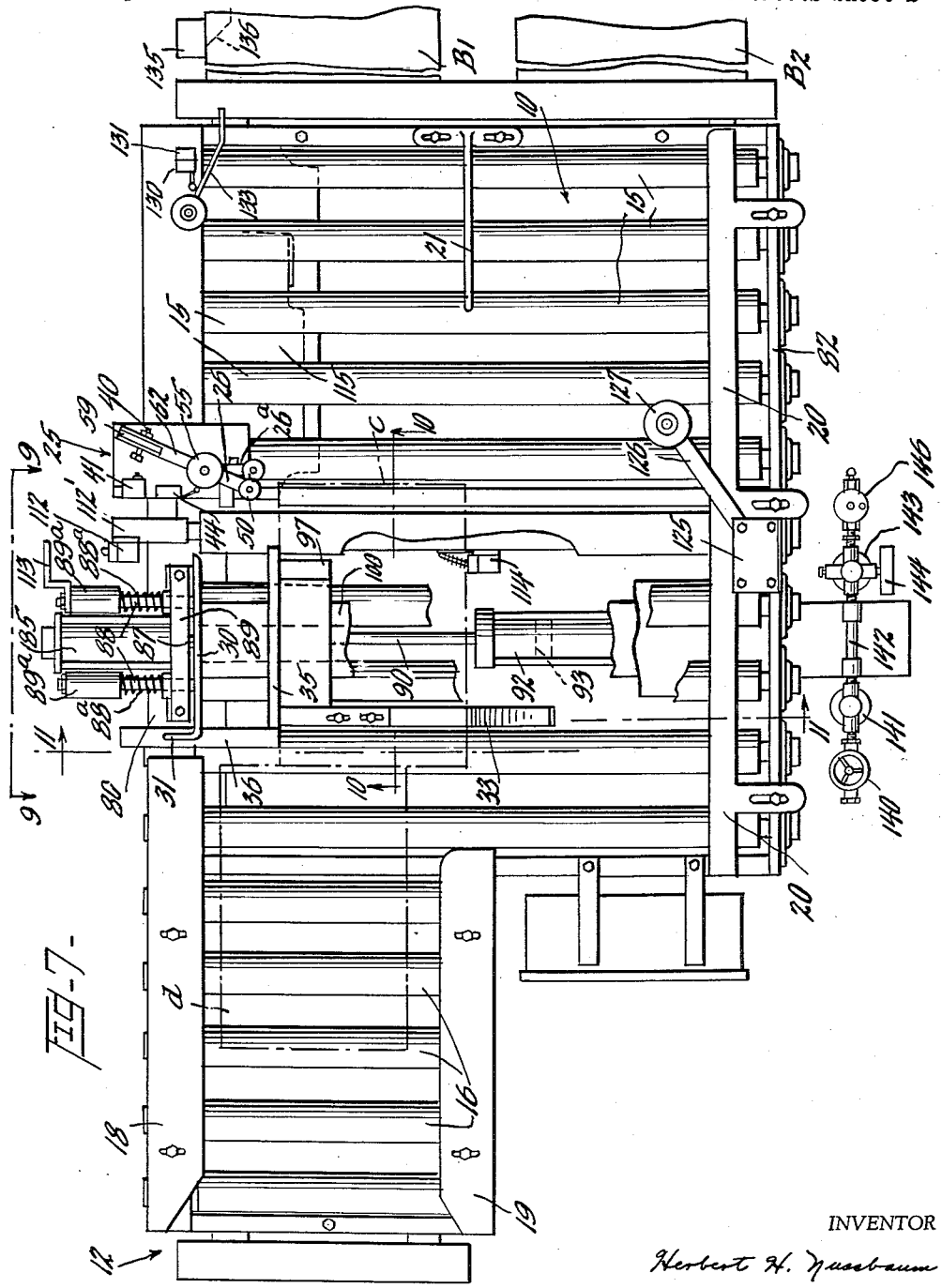

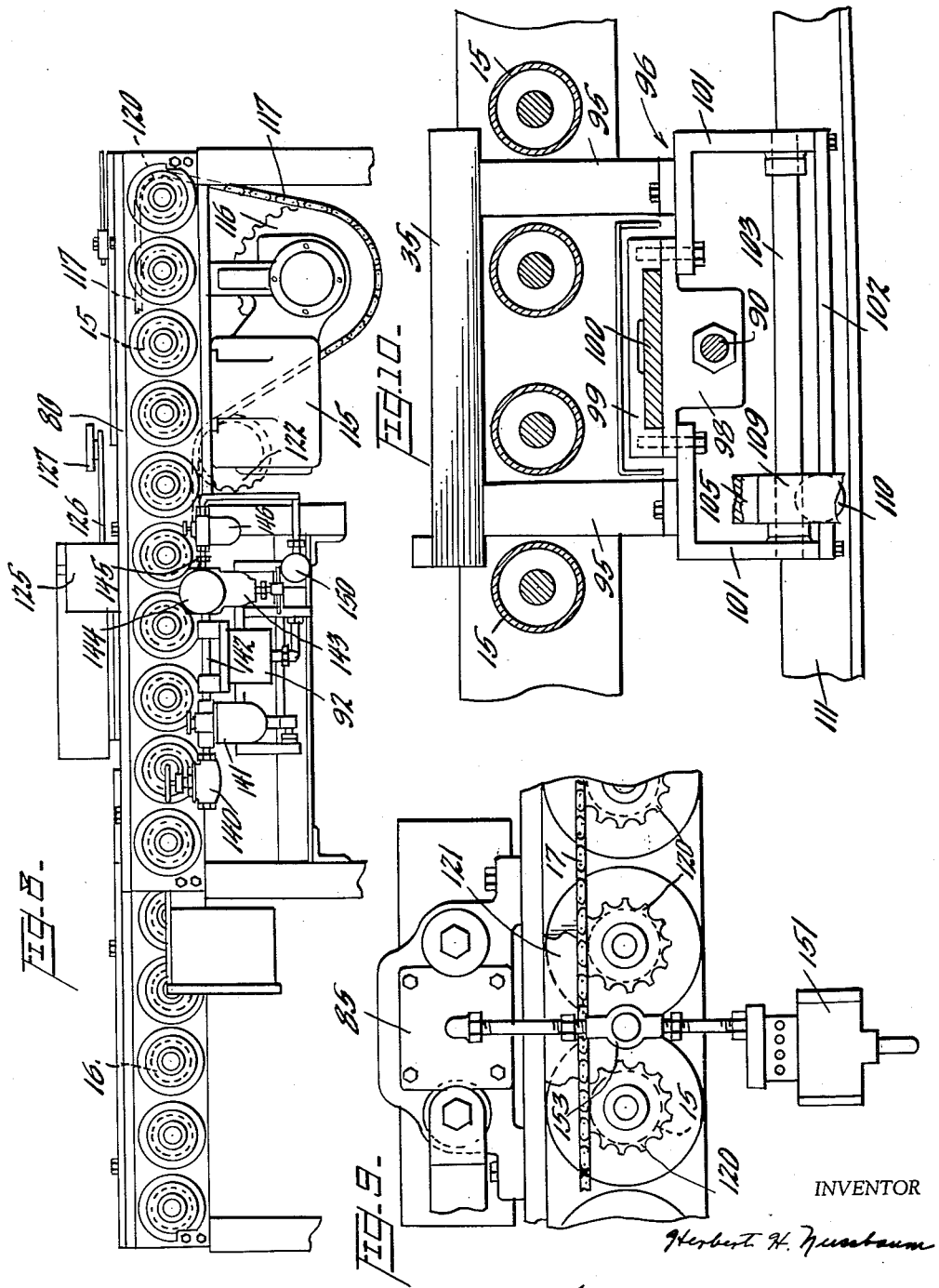

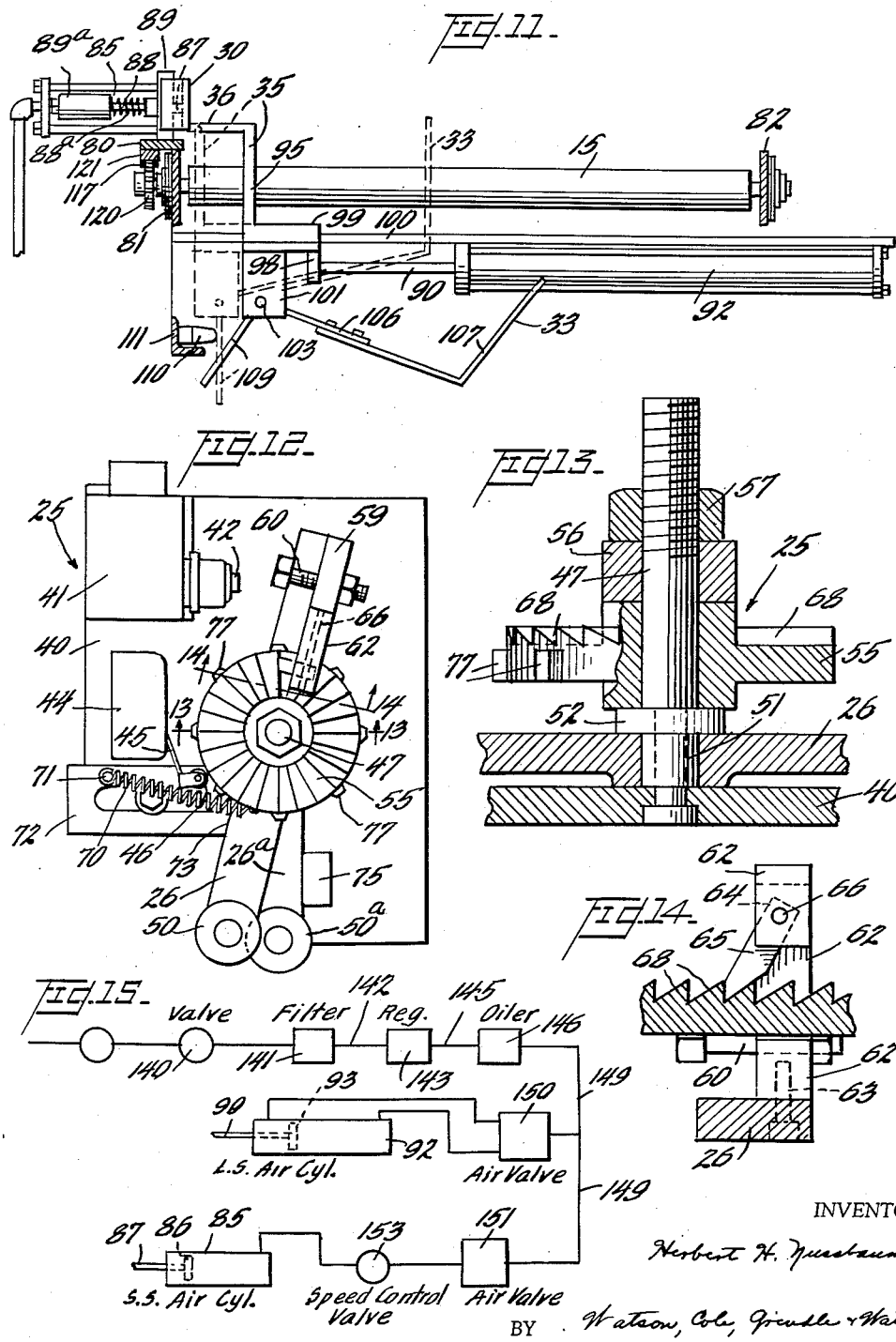

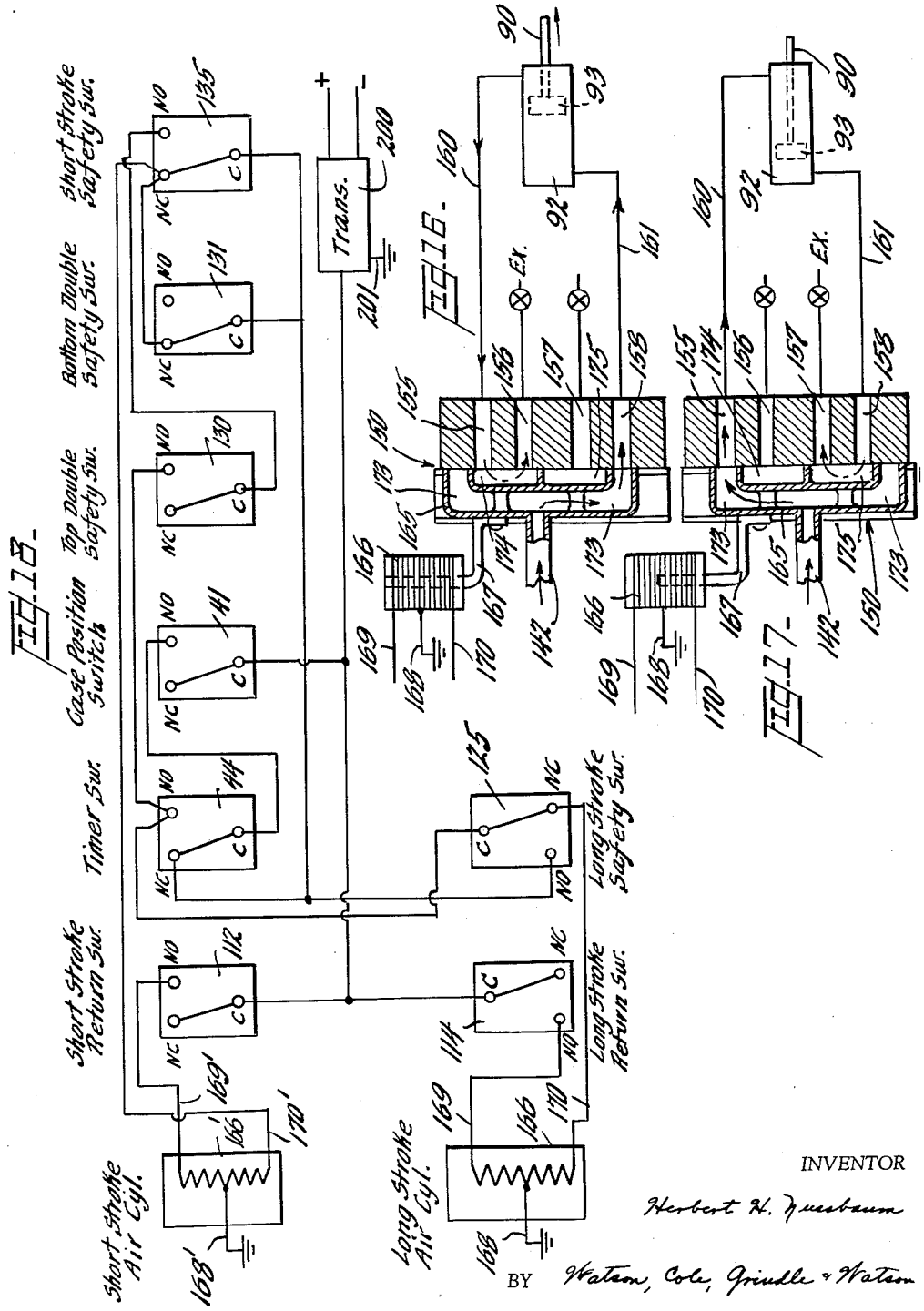

United States Patent Office 2,966,251
Patented Dec. 27, 1960

2,966,251

POWER DRIVEN CONVEYORS

Herbert H. Nussbaum, Bainbridge, Ga., assignor to Miller Hydro Company, Bainbridge, Ga., a corporation of Georgia Filed Apr. 9, 1958, Ser. No. 727,367

18 Claims. (Cl. 198—31)

This invention relates to power driven conveyors and more particularly to switching installations for diverting articles being carried upon a conveyor selectively along divided paths toward separate delivery points.

The general object of the invention is to provide a novel and improved installation of the class described which is of relatively simple construction and subject to automatic operation to proportion the delivery of articles along the divided paths according to a predetermined pattern.

In many manufacturing, processing, treating, assembling, packing, or loading systems, situations are encountered where articles or goods are delivered in sequence from a station or stage in the system at a given rate, and the equipment or method of handling of the items at the next succeeding stage is of such a nature that its capacity would be exceeded if it were made to receive all of the items at their established rate of flow from the preceding station. Multiple accommodations are therefore sometimes provided at said succeeding stage, and the stream of articles is divided and directed to the plural accommodations in proportion to their respective capacities. A specific suggestive example of such a condition would be where bottle containers or cases are fed from a point of manufacture or reconditioning to one or more bottle receiving points; or where cases of empty bottles are moved say from a bottle washing and sterilizing station to one or more bottle filling machines.

In its preferred embodiments, the invention contemplates the provision of a power driven conveyor section, the initial portion of which is of a width to accommodate a single line series of the articles to be handled, and which is widened at the switching point to provide a platform section of a transverse dimension at least twice that of the articles themselves.

The installation, so far as the novel features of the present concept are concerned, is then completed by the provision of two preferably parallel discharge conveyor sections extending in the same general direction as the initial receiving section. The platform section where the switching is accomplished, is equipped with a selectively actuated pusher for displacing the articles transversely from their initial path to a point where they are lined up with the second of the two delivery sections. Articles which are not displaced by this pusher are eventually permitted to proceed along the first of the discharge conveyor sections which is in approximate alignment with the receiving section of the installation.

Means are provided for temporarily halting each article or unit when it arrives at the switching point, but normally only long enough to permit the functioning of the selective pusher devices. Automatic counting means are used to determine the period of actuation of the transverse pusher, and thus set the ratio of the number of articles which are thus diverted toward the second delivery conveyor section to the number of articles allowed to proceed along the substantially aligned first delivery conveyor section. A supplemental pusher member may be used to shift the continuing articles slightly to clear the temporary stop means.

Novel fluid pressure means and electrical control circuits are employed in pursuing the invention as will be clearly described hereafter.

Further features of novelty include automatic means for utilizing alternate delivery paths, if one or the other of the preselected paths should become blocked, as well as for shutting off all switching operations if both delivery lines are blocked.

Other objects and features of novelty will be apparent from the following specification when read in connection with the accompanying drawings in which one embodiment of the invention is illustrated by way of example.

In the drawings:

Figure 1 is a schematic plan view of a conveyor system employing a switching installation embodying the principles of the invention;

Figures 2, 3, 4, 5 and 6 are plan views still quite diagrammatic and on an enlarged scale, showing various stages of progress of articles through the installation;

Figure 7 is a plan view on a further enlarged scale of the switching platform;

Figure 8 is a view in side elevation ot fhe novel switching platform;

Figure 9 is a fragmentary view in elevation of a portion of the installation taken substantially on line 9—9 of Figure 7;

Figure 10 is a vertical sectional view taken substantially on line 10—10 of Figure 7;

Figure 11 is a transverse vertical sectional view taken on line 11—11 of Figure 7;

Figure 12 is a fragmentary detail plan view of the timer installation for proportioning the switching operations;

Figure 13 is a vertical sectional view taken on line 13—13 of Figure 12;

Figure 14 is a fragmentary sectional view taken on line 14—14 of Figure 12;

Figure 15 is a diagram showing the fluid pressure connections for operating the pushers;

Figures 16 and 17 are diagrams of the valving for the principal pusher device in its two positions of operation; and Figure 18 is a circuitry diagram showing the electrical equipment involved in the switching installation control.

The purely schematic view comprising Figure 1 illustrates generally the purpose and function of the invention where a series of articles are forwarded toward the right from a conveyor A and these articles are distributed according to a predetermined ratio between the discharge conveyors $B_1$ and $B_2$, the conveyor $B_1$ being preferably in approximate alignment with the incoming conveyor A while the conveyor $B_2$ is offset from the alignment of conveyors A and $B_1$ and preferably, although not necessarily, disposed in parallel relation with conveyor $B_1$.

The area designated C in Figure 1 comprises a switching platform upon which the articles are continually urged in a direction toward the right in the figure but which is equipped with means for temporarily halting the articles, and selectively causing them to proceed either in substantially continuous movement onto discharge conveyor $B_1$ or to be shifted transversely to be delivered to the alternate discharge conveyor $B_2$.

Before presenting the operational details of the selective switching arrangements, the general method of handling the articles will be adverted to in somewhat more detail in connection with Figures 2–6 inclusive of the drawings wherein the switching platform C is shown upon an enlarged scale.

The platform C comprises a rather wide portion 10 which is at least twice the width of the individual conveyors A, $B_1$ or $B_2$, and a narrower receiving portion 12 which is in effect a continuation of the receiving conveyor A. Both portions of the platform are provided with power driven rollers, designated 15 and 16, which serve to continually urge articles supported thereon in a direction from left to right in these figures.

In the particular embodiment disclosed herein the articles comprise a series of bottle cases which are designated a, b, c, d, e. . . .

The platform section 12 may be provided with adjustable side guides 18, 19 and the remote edge of the principal section 10 of the platform C is provided with a somewhat inclined side wall portion 20 leading toward the conveyor $B_2$. A short dividing partition 21 may be provided to separate the discharge portions of the platform leading respectively to the delivery conveyors $B_1$ and $B_2$.

In Figure 2 of the drawings a bottle case a is shown leaving the platform section and proceeding along the conveyor $B_1$. The next succeeding case b has arrived at the point on the switching platform C where it is temporarily halted for the appropriate actuation of the switching devices. The numeral 25 is employed to designate generally the combined stop element and switch actuating device and it will be seen that a projecting switch actuator arm or lever 26 is abutted by the case b.

For the purposes of this illustration, it is assumed that the predetermined ratio of delivery of the cases as between the conveyors $B_1$ and $B_2$ is 2:1. Therefore, the case b is to be delivered onto the discharge conveyor $B_1$ just as was the preceding case a. This being the situation, the mechanism is actuated (as will be described in detail hereinafter) so as to cause a stop and release member 30 to contact with and displace the case b slightly toward the right, considering its direction of travel, from the position shown in Figure 2 to the position shown in Figure 3 whereupon the case is in a position to pass substantially along its original path beyond the switch-stop device 25 and to be carried by the powered rolls 15 onto the aligned conveyor $B_1$.

Meanwhile the side arm or flange portion 31 of the member 30 has halted the next case c until the case b has proceeded on its way. Meanwhile the member 30 has been retracted to its position as shown in Figures 2, 4, 5 and 6, and the case c proceeds to contact the switch-stop device 25.

Ordinarily the cases are kept more or less in proper alignment by the uniform speed of the rolls 15 and 16 and by contact with the next succeeding case as suggested, for example, in Figure 3. However, if the case d is not following closely upon the case c, as shown in Figure 4, a keeper element 33 serves to prevent disalignment of the case due to its corner contact with the stop-switch device 25.

Now according to the predetermined setting of the switching mechanism 25, 26, it is time for a case to be shifted transversely to move on to the conveyor $B_2$. Therefore, the switching means 25 actuates a case transferring pusher member 35 of considerably longer thrust than the displacing member 30. The pusher 35 transfers the case c to the position shown in Figure 5 out of the general alignment of conveyor sections 12 and $B_1$ while the flange 36 on the pusher 35 prevents the advance of the succeeding case d. At the same time, the retainer member 33 advances with the pusher 35 or is retracted out of the path of the case c.

The continual urging of the powered rolls 15 causes the case c to pass toward the right in Figure 6 onto the conveyor $B_2$ while the retraction of the long-travel pusher 35 with its flange 36 permits the case d to proceed to contact the stop-switch device 25 as before. The timing of course is such that the case d and the next succeeding case e are both permitted to proceed along the aligned discharge conveyor $B_1$ under the selective action of the short thrust stop and release member 30 just as in the case of the cases a and b as previously described.

The details of the stop-switch installation 25 will now be set forth in detail with particular reference to Figures 7, 12, 13 and 14. The device 25 comprises essentially a base 40 which carries a switch 41 actuated by a button or plunger 42, and a switch 44 actuated by an arm 45 carrying a follower roller 46. A bolt or spindle 47 rises from the base 40 and provides a pivot for the switch actuating arm 26 which carries a roller 50 at its outer end against which the successive cases come into contact. A bushing 51 may surround the spindle 47 and provide a bearing for the arm 26. Above the arm 26 a separating washer 52 is disposed and above this washer there is rotatably mounted a ratchet wheel 55, which is surmounted by a washer 56 and a nut 57. At the end of the timer arm 26 opposite the end upon which the contact roller 50 is mounted, an upward projection 59 is formed which carries a bolt or pin 60 which serves to contact with and depress the button 42 which actuates the switch 41.

Just inwardly of the rearwardly disposed block or projection 59 there is secured upon the arm 26 a vertical extension 62 which may be fastened to the arm 26 by means of the screws 63 as shown in Figure 14 of the drawings. The upper portion of the block 62 comprises an arch construction providing a notch or recess 64 adapted to receive a pawl 65 which is mounted for swinging movement on a pin 66 which bridges the recess 64.

The ratchet wheel 55 has radially extending teeth 68 formed on the upper surface thereof and the pawl 65 is adapted to engage successive ones of the teeth 68 when the arm 26 is swung, and serves to step the ratchet wheel 55 around the pivot spindle 47.

A coil spring 70 has one end secured to the timer arm 26 and the other end fixed as at 71 to a stop block 72 which has a forward face 73 which limits the return movement of the switch stop or timer arm 26. A stop block 75 serves to limit the forward or actuating movement of the arm 26 at a point where the bolt 60 has been brought to bear sufficiently upon the push button 42 to actuate the switch 41. Also, a supplemental stop arm 26a carrying a roller 50a is fixed to the base 40 in a position just below the displaced position of timer arm 26 and its roller 50, whereby the supplemental member will share the concussion caused by the approaching case and prevent damage to the timer arm and its associated parts.

At predetermined intervals around the periphery of the ratchet wheel 55 are applied the wedge-shaped tooth-like protuberances or cams 77. The cams 77 are so selectively disposed about the periphery of the ratchet wheel 55 as to contact the wheel 46 on the switch actuating arm 45, to actuate the switch 44 at predetermined intervals to attain the operation of the long-travel pusher 35. In the set-up illustrated for purposes of example, the switch 44 is actuated by the cams 77 upon each third movement of the arm 26 and thus preserves the 2:1 ratio of switching of the cases.

The details of the electrical circuitry for effectuating the operation of the switching means from the timer or accumulator device 25, 26 will be described presently.

Next in logical sequence to be presented in detail will be the short-stroke displacing device 30 and its associated mechanism. Referring particularly to Figures 7 and 11 of the drawings, it will be seen that this pusher member is supported above the side plate 80 of the platform C which is in turn carried upon the side rail 81 which forms, together with the opposite side rail 82, bearing supports for the driven rollers 15. A pneumatic cylinder 85 carries a piston 86 (shown only in the diagram of Figure 15), the rod 87 of which carries upon its end the pusher blade 30. Fluid pressure connections for the cylinder 85 will be described presently. Rods 88 carried by the member 30 extend through openings in the frame part 89 and carry abutments 89a between which abutments and the frame part 89 the springs 88a are compressed. The springs 89a serve to continually urge the member 30 outwardly of the conveyor toward inoperative position, the projection of the member 30 against the urging of the springs being effected by the piston within the cylinder 85.

The long-stroke pusher 35 with its flange 36 is mounted upon a piston rod 90 which enters the fluid pressure cylinder 92 and is fixed to a position 93 working therein. This actuating piston rod 90 is propelled in both directions by fluid pressure and is provided with no spring device.

Referring more particularly to Figure 10, it will be seen that the pusher 35 is mounted on the two side frame pieces 95, which pieces are supported from the yoke frame designated generally by the numeral 96 and comprising a plate 98 to which the piston rod 90 is secured and an upper guide plate 99 which embraces the supporting guide bracket 100 upon which the whole arrangement slides transversely of the platform. Further portions of the frame 96 includes the downwardly projecting angle brackets 101 which are connected at their lower ends by the cross piece 102 and which carry the shaft 103 upon which the lateral stop member 105 is pivoted. This stop member comprises an angle piece 106 one arm of which carries an adjustable extension piece 107 the end of which constitutes the stop 33 already mentioned. The inner arm 109 of the angle piece 106 is arranged to strike the bumper element 110 which is carried by a lower frame piece 111 of the installation. It will be readily seen from the solid and dotted line positions of the pusher frame 35 and its related elements that the arm 109 will strike the bumper 110 when the pusher 35 is in its fully retracted position and the stop 33 will then assume its erect position as shown in the broken lines in Figure 11. Conversely, when the pusher 35 is moved across the platform to displace the cases for delivery to conveyor B₂ the stop arm 33 drops to inoperative position and the cases are moved over to be guided by the side guide element 20.

At the outer ends of the strokes of the respective members 30 and 35 switches are actuated for initiating the return strokes. A switch 112 is mounted on a bracket 112' and is contacted and actuated by an arm 113 carried by the movable framework associated with the short-stroke displacing member 30. A switch 114 is mounted on the supporting framework of the platform in the path of the framework 97 which forms a part of the long-stroke pusher assembly 35. It will be readily seen how these switches 112 and 114 are actuated when the members 30 and 35 respectively reach the ends of their strokes. Through circuitry yet to be described the return strokes of the pushers are initiated.

The conveyor rollers 15 and 16 may be driven by any suitable or known means, but the power device illustrated in the present embodiment includes the motor 115 which drives the initial sprocket wheel 116 about which the drive chain 117 is trained. Each of the rollers 15 and 16 carries sprocket wheels 120 upon the ends thereof and the chain 117 contacts the sprocket wheels and is pressed into engagement therewith by the chain holddown strip 121 which may be made of wood if desired. The strip 121 may be supported on the underside of the side plate 80. The return side of the chain 117 may be trained around the idler sprocket 122 to guide it properly about the drive sprocket 116.

Returning now to Figure 7 of the drawings, it will be seen that a switch 125 is mounted on the frame of the platform in the lower portion of the figure and is adapted to be actuated by the arm 126 which carries the roller 127 which is contacted by a case on its way out of the switching platform toward the conveyor B₂.

Adjacent the outlet portion of the case switching platform leading toward the conveyor B₁ is a pair of switches 130 and 131 both adapted to be actuated by an arm 132 when the latter is contacted by a case leaving the platform. A switch 135 is disposed at the side of the conveyor B₁ just outside of the platform and is adapted to be actuated by an arm 136 when a case contacts the arm. The purposes and functions of these switches will be described in connection with the explanation of the circuitry involved.

The fluid pressure system for actuating the members 30 and 35 will now be described, with particular reference to Figures 7, 8, 9, 15, 16 and 17 of the drawings. The sequence of the elements in the fluid pressure system may be followed both diagrammatically and in actual delineation by observing Figures 7, 8 and 15 in conjunction one with the other. From the source of fluid pressure, for example compressed air, the fluid passes through the globe valve 140, thence to the filter 141 through the short pipe section 142, thence to the pressure regulator 143. A pressure gauge 144 may be associated with the regulator. Beyond the reducer 145 is an oiler 146 and from the oiler the pressure fluid passes to the controlling air valves 150 and 151 for the respective pusher cylinders 92 and 85. Between the air valve 151 and the cylinder 85 for the displacing member 30 there is interposed a speed control valve 153. The air valve 151, control valve 153, and the pipe connections leading to the cylinder 85 are disposed upon the far side of the installation, as clearly shown in Figure 9 of the drawings.

Referring now to Figures 16 and 17 of the drawings the air control valves for supplying fluid to the pusher operating cylinders will be described in somewhat more detail.

As already described, the piston rod 90 is connected to the long-stroke pusher 35 and is secured to the piston 93 which works in the cylinder 92 as determined by the introduction and exhaust of pressure fluid to the cylinder. The control valve 150 is provided with four orifices 155, 156, 157 and 158. The orifice 155 is connected by means of the pipe or conduit 160 at the end of the cylinder 92 upon the side to which the rod 90 is connected and serves to introduce pressure fluid to that side of the piston for retracting the rod 90 and projecting the pusher 35 to move a case toward the discharge conveyor B₂. The valve orifice 158 is connected by the line 161 to the opposite end of the cylinder for effecting the return stroke of the pusher. Orifice 156 serves as an exhaust opening for the right-hand side of the cylinder 92 and orifice 157 serves as an exhaust opening for the left-hand end of the cylinder. Speed control valves 163 may be applied to the exhaust or discharge conduits.

A sliding valve structure 165 moves across the orifices of the control valve under the influence of the solenoid 166, the armature of which is connected to the valve structure by means of a bracket 167. The central portion of the coil of the controller 166 is grounded as at 168 and the leads for alternative movement of the valve structure are shown at 169 and 170.

Fluid pressure is admitted from the line 149 to the sliding valve structure through the intake 172 and the pressure fluid continually fills the cavity 173 of the sliding valve structure. When the movable parts are shown in the positions indicated in Figure 16, the pressure cavity 173 is in registry with the orifice 158 and fluid pressure is fed to the left-hand end of cylinder 92 and serves to project the piston rod 90 and move the pusher 35 to retracted position. At the same time fluid pressure passes from the right-hand end of the cylinder through the conduit 160, the orifice 155, the inner cavity 174 of the slide valve, and thence out through the exhaust orifice 156.

For effectuating the active projecting stroke of the pusher 35, the circuitry is energized so as to cause the solenoid 166 to move the valve structure 165 to the position shown in Figure 17 of the drawings where the pressure cavity 173 is in registry with the orifice 155 and thus supplies pressure fluid to the right-hand end of the cylinder 92 through the conduit 160. This causes the piston rod 90 to be retracted and move the pusher 35 through its active orbit to displace the cases toward the conveyor $B_2$. Fluid pressure in the left-hand end of the cylinder 92 passes through the conduit 161, the orifice 158, the pocket or cavity 175, and out through the orifice 157 to exhaust.

Referring now to Figure 18 of the drawings where the electrical circuitry is revealed, and at the same time picking up the actual physical location of the various switches from Figure 7, it will be seen how the automatic distribution of the cases according to a predetermined pattern may be effected, and also how blockades in the distributing conveyors may actuate certain safety means for either diverting cases or terminating the operation of the conveyor.

The actuating current is derived from a transformer indicated at 200, one terminal of which is grounded at 201 while the solenoids which actuate the cylinder valving are grounded at 168 and 168' respectively.

It may be mentioned here that the operating means for the short-stroke displacing member 30 may be a substantial duplicate of that for operating the long-stroke pusher 35, and the valving 151 and its controlling solenoid 166' may be the same as the valving 150 and 166 in Figures 16, 17 and 18. The circuitry will be described in connection with Figure 18 as if this were the case. Any necessary variations for operating the short-stroke member 30 under the influence of the springs 88a and one-way fluid pressure control, will be obvious to one skilled in the art. In such a case the solenoid 166' will operate a control valve to merely vent the cylinder 85 when the return stroke is to be effected by the springs 88a.

The case position switch 41 has a normally open contact NO 41 adapted to be closed when the stop arm 26 is swung by contact with a case. Switch 44 which may be designated a timer switch is the one which is actuated by the cam projections 77 on the ratchet wheel 75 according to the prescribed pattern depending upon the ratio of the number of cases to proceed along conveyor $B_1$ and the number which pass out along conveyor $B_2$. As mentioned before, the ratio of the example illustrated herein is 2:1, so that upon every third case contacting the arm 26, the switch 44 will be actuated, opening the normally closed contact NC 44 and closing the normally open contact NO 44. Switch 112 is normally open but is closed by contact by the actuating arm 113 carried by the short stroke displacing member 30. Switch 114 is the long-stroke return switch and is adapted to have its contacts closed by abutment of the pusher 35 and its associated framework at the end of its stroke.

Switches 130, 131, 135 and 125 are safety switches which are actuated by the occurrence of unusual conditions associated with the delivery conveyors $B_1$ and $B_2$ and will be described in connection with the specific examples of operation to be set forth presently.

Now in normal operation of the device, viewing Figures 1–6 and 18, an approaching case, say case b, strikes the roller 50 on the end of the timer arm 26, swings the arm until the contact pin 60 upon the opposite end thereof strikes the button 42 and actuates the case position switch 41, closing the normally open contact NO 41. This causes the short-stroke displacing member 30 to begin its outward stroke, tracing the circuitry as follows: transformer 200, switch contact C 41, contact NO 41, contact C 44, contact NC 44, contact C 131, contact NC 131, contact NC 135, line 170' to solenoid 166' which controls air valve 151 which supplies pressure fluid to the cylinder 85 causing the short-stroke pusher 30 to move outwardly.

At the end of the outward stroke of the short-stroke member 30, switch 112 is closed by the actuating arm 113 which permits the short-stroke air cylinder to make its return stroke. The circuit may be traced from transformer 200 through contact C 112 through normally open contact NO 112 through line 169' to cause the solenoid 166' to reverse its action and return the member 30 to its initial or idle position.

In the present example, every third case that strikes the actuator or timer arm 26 causes a cam projection 77 on the ratchet wheel 55 to actuate switch 44. This causes the long-stroke pusher 35 to start its inward stroke to divert the case (for example case c in Figures 4 and 5) toward the right-hand side of the switching platform. This circuit may be traced as follows: transformer 200, contact C 41, contact NO 41, contact C 44, contact NO 44, contact C 125, contact NC 125, line 170, solenoid 166 to supply fluid to cylinder 92 upon the side of the piston 93 to cause the rod 90 to retract and the pusher 35 to move outwardly.

At the end of its stroke the pusher 35 actuates switch 114 which causes it to begin its return stroke. Circuitry: transformer 200, contact C 114, contact NO 114, line 169 to actuate solenoid 166 to reverse the supply of pressure fluid to cylinder 92 to cause the piston 93 to move in a direction to project the rod 90 and return the pusher 95 to idle position.

Aside from the above described normal operation of the device, certain safety features are provided as follows: If cases should back up on the discharge conveyor $B_1$, switches 130, 131 and 135 are closed. This causes the long-stroke pusher 35 to be actuated every time the arm 26 is struck by an advancing case, the circuitry being traced as follows: transformer 200, contact C 41, contact NO 41, contact C 44, contact NC 44, contact C 135, contact NO 135, contact C 130, contact NO 130, contact NO 44, contact C 125, contact NC 125, line 170 to solenoid 166 to actuate the long-stroke pusher 35. This will result in the delivery of all succeeding cases to conveyor $B_2$ so long as the discharge conveyor $B_1$ is blockaded.

If cases should back up on discharge conveyor $B_2$, switch 125 will be closed by contact of the case with the roller 127 on the arm 126. This prevents the actuation of the long-stroke pusher 35 during the existence of such conditions and the only manipulation of the cases will be by the short-stroke displacing member 30 which will operate upon each encounter by a case, and thus merely displace the cases the short distance necessary to pass around the rollers 50 and 50a and onto the conveyor $B_1$. The circuitry upon this occasion will be as follows: transformer 200, contact C 41, contact NO 41, contact C 44, contact NO 44, contact C 125, contact NO 125, contact C 131, contact NC 131, contact NC 135, line 170' to solenoid 166' to operate the short-stroke pusher 30. Thus the long-stroke displacing member 35 will be prevented from being actuated by the switch 125 having been moved from normally closed contact to its normally open contact.

It will furthermore be readily perceived that if cases back up on both discharge conveyors $B_1$ and $B_2$ switches 130, 131, 135 as well as switch 125 will be actuated and neither solenoid 166 nor 166' will be energized and neither the short-stroke pusher 30 nor the long-stroke member 35 will be moved. Thus, the cases will be stopped in the positions shown either in Figures 2 or 6 of the drawings.

It will be understood that various changes and modifications may be made in the embodiment illustrated and described herein without departing from the scope of the invention as defined by the following claims.

Having thus described the invention, what is claimed as new and desired to be secured by Letters Patent is:

1. Article handling apparatus comprising a platform for said articles, means for advancing a series of articles across a portion of said platform in one direction, stop means for positively and temporarily halting the progress means for operation whenever said transfer means is not actuated.

9. In a conveyor switching apparatus of the class described, which comprises a platform, means for continually urging articles in a series across said platform in one direction, uni-directional pusher means for shifting selected articles of said series transversely to said first direction across said platform: in combination, control means for selectively actuating said pusher means at predetermined intervals related to the relative proportion of articles to be moved transversely, said control means comprising a piston-and-cylinder fluid pressure motor for moving said pusher means, valving for alternately admitting fluid pressure to said cylinder upon one side of said piston and exhausting it from the opposite side of said piston and vice versa; electromagnetic means for actuating said valving for said alternate operation, circuitry operatively connecting said electromagnetic means with a source of current, a normally open switch in said circuitry; an oscillatable lever having one end disposed in the path of the articles in said series and adapted to be contacted and oscillated by each one in succession, a timer member adapted to be stepped one unit increment by said oscillating lever upon each oscillation thereof, and switch closing means incorporated in said timer member for closing said normally open switch upon the occurrence of a predetermined number of oscillations of said lever and of stepped unit increments of said timer member, to actuate the motor valving to move said pusher means; and article diverting means is provided to cause articles not moved transversely by said pusher means to pass around said oscillatable lever in order to continue in serial movement across the platform, a fluid pressure cylinder-and-piston motor for moving said diverting means, valving for controlling the operation of said last named means, electromagnetic means for operating the last named valving, and circuitry therefor including a normally open switch adapted to be actuated by said oscillatable lever upon every oscillation thereof.

10. Article handling apparatus of the class described comprising, in combination, a switching platform, a lead-in conveyor for moving articles in series onto said platform in a first direction, a first lead-off conveyor in substantial alignment with said lead-in conveyor adapted to receive articles of said series which are not to be subjected to switching, a second lead-off conveyor in disalignment with said lead-in conveyor and said first lead-off conveyor, and adapted to receive switched articles from a different portion of said platform, continually active article advancing means operative to move all free articles on said platform in said first direction, a stop member in the path of articles in said series, a trigger element adjacent the stop member and adapted to be actuated by contact with an article in said series, and a pusher blade mounted for movement transversely of said first direction to move articles to be switched across the platform substantially at right angles to the path of movement of said advancing series of articles, a plunger for moving said pusher blade, a fluid pressure cylinder from which said plunger extends and means actuated by non-consecutive trigger contacts for controlling the fluid pressure supply to said cylinder to cause the plunger to move the pusher blade to move articles transversely across the platform to be discharged onto said second lead-off conveyor by the advancing means.

11. Article handling apparatus of the class described comprising, in combination, a switching platform, a lead-in conveyor for moving articles in series onto said platform in a first direction, a first lead-off conveyor in substantial alignment with said lead-in conveyor adapted to receive articles of said series which are not to be subjected to switching, a second lead-off conveyor in disalignment with said lead-in conveyor and said first lead-off conveyor, and adapted to receive switched articles from a different portion of said platform, continually active article advancing means operative to move all free articles on said platform in said first direction, said advancing means comprising driven rollers upon which said articles are supported, a stop member in the path of one forward corner of each of the articles in said series, a trigger element adjacent the stop member and adapted to be actuated by contact with an article in said series, and a pusher mounted for movement transversely of said first direction to move articles to be switched across the platform substantially at right angles to the path of movement of said advancing series of articles, a plunger for moving said pusher blade, a fluid pressure cylinder from which said plunger extends and means actuated by non-consecutive trigger contacts for controlling the fluid pressure supply to said cylinder to cause the plunger to move the pusher blade to transfer articles transversely across the platform to be discharged onto said second lead-off conveyor by the advancing rollers, and retainer guide means disposed for contact by the diagonally opposite rear corner of an article abutting said stop member, to prevent slewing of the articles on the advancing rollers, and means for retracting said retainer guide means upon operation of said transfer pusher blade.

12. The apparatus as set forth in claim 11 in which the said retainer guide member is a double armed element pivotally carried by said pusher blade, one arm adapted to abut a fixed portion of said apparatus when the pusher blade is in idle position to cause the opposite arm to swing to operative position adjacent the said rear corner of the article.

13. The apparatus as set forth in claim 10 in which there is provided a second or release blade operated by similar fluid pressure means, and operating upon each contact of said trigger to displace each article not transferred by said first named pusher blade only sufficiently to clear the stop member.

14. Article handling apparatus comprising, in combination, a switching platform, a lead-in conveyor for advancing articles in series onto said platform, a pair of lead-off conveyors for receiving and advancing articles of said series from said platform in a predetermined proportion; a trigger member disposed in the path of the articles in said oncoming series, control means the operation of which is initiated by contact of each of the articles in said series with said trigger member, means actuated by said control means for shifting selected articles to apportion them among the two lead-off conveyors, means for setting said control means for the desired predetermined apportioning, means on each of the two lead-off conveyors adapted to be actuated by any articles blocking either of the lead-off conveyors and adapted to act upon said control means to cause all subsequent articles to move onto the other or unblocked lead-off conveyor.

15. Article handling apparatus comprising, in combination, a switching platform, a lead-in conveyor for advancing articles in series onto said platform, a pair of lead-off conveyors for receiving and advancing articles of said series from said platform in a predetermined proportion; a trigger member disposed in the path of the articles in said oncoming series, control means the operation of which is initiated by contact of each of the articles in said series with said trigger member, means actuated by said control means for shifting selected articles to apportion them among the two lead-off conveyors, means for setting said control means for the desired predetermined apportioning, means on each of the two lead-off conveyors adapted to be actuated by any articles blocking either of the lead-off conveyors and adapted to act upon said control means to cause all subsequent articles to move onto the other or unblocked lead-off conveyor, and means for terminating the action of each successive article in said series, uni-directional pusher means for effecting article transfer movement of selected articles of said series transversely to said first direction across said platform, article advancing means acting upon said selected transversely transferred articles to advance them successively in said first direction, and control means settable for selectively actuating said pusher means at predetermined intervals related to the relative proportion of articles to be moved transversely, said control means including means in the path of the articles in said series and associated with said stop means, and adapted to be tripped by each successive article to initiate the conditioning of said control means for operation of the transfer means or to release an article from the stop means for further progress substantially along the alignment of said first series, depending upon the setting of the control means.

2. Article handling apparatus comprising a platform for said articles; means for advancing a series of articles across a portion of said platform in one direction; stop means for positively and temporarily halting the progress of each successive article in said series; means for effecting article transfer movement of selected articles of said series transversely to said first direction but at substantially the same level; article advancing means acting upon said selected transversely transferred articles to advance them in a series moving in said first direction and parallel to the path of movement of said first series; and control means for selectively actuating said article transfer means according to a predetermined schedule with respect to the relative proportion of articles of said first series which are to be moved transversely; said control means including an element associated with said stop means and adapted to be contacted successively by each article in said first series, and counting means actuated by said element and settable to determine the interval of operation of said transfer means as a multiple of the intervals of successive actuations of said contact element; said transfer means comprising a pusher member of relatively long stroke; a release member of relatively short stroke adapted to displace articles slightly to release them from said stop means for further progress substantially along the alignment of said first series; and means operatively connecting said contact element alternatively with said short-stroke release member or with said transfer means pusher member, depending on the predetermined setting of said control means.

3. The apparatus as set forth in claim 2 in which fluid pressure motors are employed to move said pusher and release members, and electrically actuated means are employed to energize the fluid pressure motors under the control of the electrical switches actuated by successive movements of said contact element.

4. The apparatus as set forth in claim 3 in which a double-acting piston-and-cylinder motor is employed to move the long-stroke pusher member in both directions, while a single-acting piston-and-cylinder motor is used to project the short-stroke release member, and spring means are provided to retract the latter member.

5. The apparatus as set forth in claim 3 in which a limit switch is disposed in the path of each said pusher and release members for controlling the circuitry to effect reversal of the movements of said members when they have reached the end of their strokes.

6. In a conveyor switching apparatus of the class described, which comprises a platform, means for continually urging articles in a series across said platform in one direction, uni-directional pusher means for transferring selected articles of said series transversely to said first direction across said platform: in combination, control means for selectively actuating said pusher means at predetermined intervals related to the relative proportion of articles to be moved transversely, said control means comprising power means for moving said transfer means, means for energizing said power means, an oscillatable element having a portion disposed in the path of the articles in said series and adapted to be successively oscillated thereby, an accumulator member adapted to be stepped along in its cycle of movement through an increment thereof by each movement of said oscillatable element, and means adapted to be tripped upon the completion of a predetermined number of increments of movement of said accumulator to initiate the energizing means for said pusher means; and diverting means for slightly deflecting such articles as are not acted upon by said transfer means to enable them to pass said oscillatable element and proceed along the same alignment as the said series of articles, and means adapted to be tripped by said oscillatable element upon each movement thereof to energize said diverting means for operation whenever said transfer means is not actuated.

7. In a conveyor switching apparatus of the class described, which comprises a platform, means for continually urging articles in a series across said platform in one direction, uni-directional pusher means for shifting selected articles of said series transversely to said first direction across said platform: in combination, control means for selectively actuating said pusher means at predetermined intervals related to the relative proportion of articles to be moved transversely, said control means comprising fluid pressure means for moving said pusher means; electromagnetic means, a source of electric current, and appropriate circuitry for energizing said fluid pressure means; a pivoted oscillatable lever having a portion disposed in the path of the articles in said series and adapted to be successively oscillated thereby; a rotary ratchet wheel concentric with the pivot point of said lever and having a peripheral series of ratchet teeth thereon, a pawl on said lever adapted to contact said teeth to step said wheel adapted to be stepped around in its cycle of movement through an increment thereof by each movement of said oscillatable lever, a plurality of switch actuating projections disposed about the periphery of said wheel, the spacing between each of said projections being equal to the extent of a plurality of said ratchet teeth and a switch adapted to be actuated by one of said projections upon the completion of a predetermined number of increments of movement of said ratchet wheel to initiate the energizing of the fluid pressure means for actuating said pusher means.

8. In a conveyor switching apparatus of the class described, which comprises a platform, means for continually urging articles in a series across said platform in one direction, uni-directional pusher means for shifting selected articles of said series transversely to said first direction across said platform: in combination, control means for selectively actuating said pusher means at predetermined intervals related to the relative proportion of articles to be moved transversely, said control means comprising fluid pressure means for moving said pusher means; electromagnetic means, a source of electric current, and appropriate circuitry for energizing said fluid pressure means; an oscillatable lever having a portion disposed in the path of the articles in said series and adapted to be successively oscillated thereby; a rotary ratchet wheel adapted to be stepped around in its cycle of movement through an increment thereof by each movement of said oscillatable lever, and a switch adapted to be actuated upon the completion of a predetermined number of increments of movement of said ratchet wheel to initiate the energizing of the fluid pressure means for actuating said pusher means; and diverting means for slightly deflecting such articles as are not acted upon by said transfer means to enable them to pass said oscillatable lever and proceed along the same alignment as the said series of articles, and switch means adapted to be tripped by said oscillatable lever upon each movement thereof to energize said diverting of said control means entirely upon any blocking of both lead-off conveyors.

16. Article handling apparatus comprising, in combination, a switching platform, a lead-in conveyor for advancing articles in series onto said platform, a pair of lead-off conveyors for receiving and advancing articles of said series from said platform in a predetermined proportion; a first article controlling means for directing articles onto the first of said lead-off conveyors, a second article controlling means for directing articles onto the second of said lead-off conveyors; electrically operated means for actuating said controlling means, a source of electric current, and circuitry joining said electrically operated means and said source of current; said circuitry including a first actuating switch which is normally open and adapted to be closed upon contact by each article traversing the platform, a second actuating switch associated with said first actuating switch and movable between two alternative contacts and adapted to be moved from the first of said contacts to the second upon the occurrence of a predetermined number of actuations of said first actuating switch; the circuitry being such that the closing of the first named actuating switch prepares the circuitry for energizing the first named article controlling means for directing articles onto the first named lead-off conveyor, and the closing of said second named actuating switch prepares the circuitry for energizing the second named article controlling means for directing articles onto said second named conveyor; a normally closed safety switch associated with the first of said lead-off conveyors and adapted to be opened by a blockade of articles on said first named conveyor to prevent the energizing of said first named controlling means and for energizing the second named controlling means even though out of its sequence, and a second normally closed safety switch associated with the second of said lead-off conveyors and adapted to be opened by a blockade of articles on said second named conveyor to prevent the energizing of said second named article controlling means.

17. The article handling apparatus set forth in claim 16 in which a proportioning switch actuator device is provided which serves as a tripping instrumentality interposed between the successive articles traversing said platform and said actuating switches, and comprises an arm which actuates said first named actuating switch upon contact by every article, and an accumulator device which is operatively associated with said second named actuating switch to actuate the latter upon contact by articles a predetermined number of positions apart in said series, the circuitry providing successive connections from said first named actuating switch through said second named actuating switch, and thence through the respective safety switches.

18. Article handling apparatus comprising, in combination, a switching platform, a lead-in conveyor for advancing articles in series onto said platform, a pair of lead-off conveyors for receiving and advancing articles of said series from said platform in a predetermined proportion; a first article controlling means for directing articles onto the first of said lead-off conveyors, a second article controlling means for directing articles onto the second of said lead-off conveyors; electrically operated means for actuating said controlling means, a source of electric current, and circuitry joining said electrically operated means and said source of current; said circuitry including a first actuating switch which is normally open and adapted to be closed upon contact by each article traversing the platform, a second actuating switch associated with said first actuating switch and movable between two alternative contacts and adapted to be moved from the first of said contacts to the second upon the occurrence of a predetermined number of actuations of said first actuating switch; the circuitry being such that the closing of the first named actuating switch prepares the circuitry for energizing the first named article controlling means for directing articles onto the first named lead-off conveyor, and the closing of said second named actuating switch prepares the circuitry for energizing the second named article controlling means for directing articles onto said second named conveyor; a normally closed safety switch associated with the first of said lead-off conveyors and adapted to be opened by a blockade of articles on said first named conveyor to prevent the energizing of said first named controlling means and for energizing the second named controlling means even though out of its sequence, and a second normally closed safety switch associated with the second of said lead-off conveyors and adapted to be opened by a blockade of articles on said second named conveyor to prevent the energizing of said second named article controlling means; and the circuitry through the safety switches being such that it is broken to both article controlling means when blockades on both of the lead-off conveyors open both safety switches.

References Cited in the file of this patent

UNITED STATES PATENTS

| | | |
|---|---|---|
| 1,102,832 | Wetmore | July 7, 1914 |
| 2,493,464 | Nelson | Jan. 3, 1950 |
| 2,726,751 | Levitt | Dec. 13, 1955 |